United States Patent [19]

Ando

[11] Patent Number: 5,171,559
[45] Date of Patent: Dec. 15, 1992

[54] PROCESS FOR PURIFYING SILVER NITRATE SOLUTION USING ACTIVATED ALUMINA

[75] Inventor: Kikuo Ando, Kanagawa, Japan
[73] Assignee: Fuji Photo Film Co., Ltd., Kanagawa, Japan
[21] Appl. No.: 732,879
[22] Filed: Jul. 19, 1991
[30] Foreign Application Priority Data Jul. 19, 1990 [JP] Japan .................................. 2-189438

[51] Int. Cl.$^5$ ......................... C01G 5/00; B01D 15/08; G03C 1/494
[52] U.S. Cl. ....................................... 423/395; 423/25; 423/22; 423/658.5; 210/660; 210/688; 210/912; 430/564
[58] Field of Search ................... 423/395, 397, 25, 22, 423/23, 390, 390 P, 491, 658.5; 430/564; 210/660, 688, 914, 912

[56] References Cited

U.S. PATENT DOCUMENTS

| | | | |
|---|---|---|---|
| 2,614,029 | 10/1952 | Moede | 423/25 |
| 2,940,828 | 6/1960 | Moede | 423/25 |
| 4,136,157 | 1/1979 | Asai et al. | 423/395 |
| 4,744,825 | 5/1988 | Chen et al. | 210/688 |
| 4,824,576 | 4/1989 | Sood et al. | 210/688 |

Primary Examiner—Michael Lewis
Assistant Examiner—Peter T. Mauro
Attorney, Agent, or Firm—Sughrue, Mion, Zinn, Macpeak & Seas

[57] ABSTRACT

A process for removing heavy metals from a silver nitrate solution is disclosed. The process comprises the step of bringing said silver nitrate solution into contact with activated alumina having a surface acidity of at least 8 and an average pore diameter of not more than 50 Å.

8 Claims, No Drawings

PROCESS FOR PURIFYING SILVER NITRATE SOLUTION USING ACTIVATED ALUMINA

FIELD OF THE INVENTION

The present invention relates to a process for purifying silver nitrate solution using an activated alumina for the removal of heavy metals from the solution. More particularly the present invention is concerned with a process using activated alumina capable of effectively removing Group VIII metals of the Periodic Table that are harmful to photographic performance in order to produce high purity silver nitrate according to a simplified purification process.

BACKGROUND OF THE INVENTION

Until now, silver nitrate has been produced by dissolving a metal radical in nitric acid. The silver nitrate thus obtained, however, contains various heavy metals (e.g., Fe, Cu, Pd, Ni, Hg, Cd, Pt, Rh, and Cr) as impurities. However, to use this silver nitrate in certain photographic, catalytic, and analytical applications, it is necessary to remove these heavy metal impurities.

Conventional methods for removal of heavy metal impurities from crude silver nitrate solution can be roughly classified into a crystallization method, an adsorption method, and a coprecipitation method.

Of these methods, the purification method utilizing adsorption is most advantageous for use with a process because purification can be carried out continuously. That is, heavy metals can be removed selectively and continuously by passing the crude silver nitrate solution through an adsorption column packed with granular adsorbent such as carbon black, activated alumina, and magnesia. Of these adsorbents, activated alumina is the only one that is not a fine powder, and thus least likely to clog the adsorption column. However, activated alumina is difficult to use because the rate of removal of heavy metal impurities varies markedly depending on the type of the metal.

Recent improvements in performance of photographic silver halide light-sensitive material require high purity silver nitrate as a main starting material.

This has increased the demand for the effective removal of heavy metal impurities from silver nitrate. Group VIII elements of the Periodic Table, especially the platinum group elements, which are harmful for photographic performance, must be removed so that no more than 15 ppb, preferably no more than 5 ppb, remain. Conventional activated alumina, however, does not have sufficient adsorption capability to meet these requirements.

U.S. Pat. No. 2,543,792, for example, discloses a method in which an aqueous silver nitrate solution is continuously brought into contact with elemental carbon (for example, carbon black) and activated alumina, and then treated with silver nitrate to remove metal impurities. U.S. Pat. No. 2,614,029 discloses a method in which aqueous silver nitrate solution is treated with sufficient silver oxide to make the pH of the aqueous silver nitrate solution at least 6.1; the metal and metal hydroxide thus precipitated are separated; and the resulting solution is brought into contact with a water-insoluble porous solid adsorbent such as activated alumina or magnesia to remove the metal impurities.

In accordance with the methods described in the examples of the above U.S. Patents, however, even though a combination of activated alumina and carbon black as an adsorbent is employed, the concentration of residual platinum group elements such as platinum (Pt), rhodium (Rh), and palladium (Pd) is 20 to 300 ppb.

As described above, conventional activated alumina used as an adsorbent does not have an adsorption capability sufficient to remove platinum group elements that are harmful to photographic performance, to the order of magnitude less than 15 ppb. For this reason, even though adsorption purification using activated alumina is used, crystallization must be repeated several times after the adsorption purification in order to remove the platinum group elements to an order of magnitude less than 15 ppb, or the adsorption method must be employed in combination with other methods. In repeating the crystallization, the heavy metal elements are concentrated in the filtrate, and thus the purification efficiency is increasingly decreased. Thus, the advantages of purification using adsorption cannot be attained.

Another method of removing the platinum group elements to an order of magnitude of 15 ppb is described in International Application JP-A-63-502890. In accordance with this method, (1) crude silver is dissolved in nitric acid to form a crude silver nitrate solution, (2) an alkali agent such as sodium hydroxide is added to the crude solution to precipitate metal impurities, and an incompletely purified silver nitrate solution is separated, (3) a selective reductant such as sodium formate is added to the solution to precipitate silver powder while leaving the metal impurities in the solution, (4) the silver powder is dissolved in nitric acid to form a highly purified silver nitrate solution, and (5) crystallization is conducted to obtain ultra-pure silver nitrate. This method is unsuitable for practical use because the operation is complicated. In addition, the production cost is high because twice the quantity of nitric acid, compared to that of other methods is required.

As described above, to produce high purity silver nitrate for use in photography, crystallization must be repeated many times after adsorption purification with activated alumina, or a method as described in International Application JP-A-63-502890, which is complicated in operation and requires a high production cost, must be employed.

SUMMARY OF THE INVENTION

An object of the present invention is to provide a process for removing heavy metals from a silver nitrate solution by using activated alumina for purification, which is free from the problems of the prior art and is excellent for removing heavy metals.

Another object of the present invention is to provide a process for the production of high purity silver nitrate using a purification method that is greatly simplified compared to known techniques.

These and other objects are achieved by a process for removing heavy metals from a silver nitrate solution by bringing the silver nitrate solution into contact with activated alumina having a surface acidity of at least 8 and an average particle pore diameter of not more than 50 Å.

DETAILED DESCRIPTION OF THE INVENTION

It has been found according to the present invention that as an adsorbent, activated alumina which has a basic surface acidity adsorbs heavy metals more easily than does activated alumina which has an acidic surface acidity. In addition, activated alumina which is basic and has a pore diameter not exceeding a specified range is very effective in removing heavy metals. That is, there is a relationship among the surface acidity of an activated alumina particle, the pore diameter of the activated alumina particle, and the properties of an element based on its position in the Periodic Table to be incorporated in the pores. In particular, heavy metal elements are more easily adsorbed on activated alumina which has an average pore diameter of not more than 50 Å.

Although the reason for this is not clear, it is assumed that as the curvature of wall of the pore decreases, the properties of the wall surface of the pore vary or the curvature of the wall in the pore itself is subjected to conditions such that heavy metals are easily adsorbed.

The present invention will hereinafter be explained in detail.

First the activated alumina used in the present invention is explained.

The surface acidity of the activated alumina used in the present invention is at least 8 and preferably at least 9. If the surface acidity is less than 8, the heavy metal element adsorption capability is decreased. On the other hand, if the surface acidity is too large, the amount of silver adsorbed is increased. Thus the surface acidity is preferably not more than 12.

The average pore diameter of the activated alumina used in the present invention is not more than 50 Å and preferably not more than 40 Å. If the average pore diameter is more than 50 Å, the heavy metal element adsorption capability is decreased. On the other hand, if the average pore diameter is too small, the adsorption efficiency tends to decrease, although it varies with the type of heavy metal element to be adsorbed. Thus the average pore diameter is preferably at least 15 Å and more preferably at least 20 Å.

Methods for measuring the surface acidity and average pore diameter of the activated alumina are described below.

Measurement of Surface Acidity of Activated alumina

The surface activity of the activated alumina was measured according to JIS Z 8802-7 (pH measuring method). In a hard Erlenmeyer flask were placed 5 g of activated alumina and 100 ml of water which was previously freed of carbon dioxide gas by boiling. The flask was scaled and the mixture was agitated for 5 minutes, after which time the pH of the supernatant or filtrate was measured by the use of a glass electrode.

Measurement of Average Pore Diameter of Activated alumina

The average pore diameter (d) of the activated alumina is defined as follows.

Assuming that the total pore surface area of activated alumina is S, the total pore volume is V, and the sum of lengths of all pores is L, $$S = \pi \times d \times L$$

$$V = (\tfrac{1}{4}) \times \pi \times d^2 \times L$$

Accordingly,
$$d = (4 \times V)/S$$

The total pore surface area S is measured by a nitrogen gas adsorption method (so-called B.E.T. method). That is, the total pore surface area S is determined from a hysterisis curve of an adsorption isotherm obtained by increasing and decreasing the nitrogen gas adsorption amount.

The total pore volume V is measured by a mercury-helium method. That is, activated alumina powder is weighed and placed in a container the volume of which has been previously measured, and the dead volume of filled container is measured using helium. Then, after evacuation of the helium, the dead volume of the filled container is measured using mercury. Mercury does not enter the pores because it does not wet a solid. Accordingly, by subtracting the dead volume measured using mercury, from the dead volume measured using helium, the total pore volume V is determined.

The activated alumina of the present invention is porous, and it is preferred that the crystal form is γ-type (i.e., $\gamma$-$Al_2O_3$), the particle size is 0.2 to 2 mm, and the specific surface area is 100 to 400 $m^2/g$.

In general, activated alumina is produced by electrolysis or hydrolysis of an aluminum compound, or from metallic aluminum.

In accordance with one of the methods of producing the activated alumina used in the present invention, ammonia is added to an aqueous solution of aluminum nitrate, aluminum sulfate or aluminum chloride to precipitate alumina, and the precipitate thus obtained is washed well with distilled water, dried and then calcined at 450° to 500° C. for 3 to 6 hours.

In accordance with another method, bauxite is ground and dissolved in a caustic soda solution with heating, and after separation by filtration of the insoluble material, aluminum hydroxide crystals are precipitated from the resulting solution. These aluminum hydroxide crystals are separated by filtration, washed with water and dried to obtain white crystals of aluminum hydroxide. Depending on the type of the bauxite, the treating conditions, and so on, as the aluminum hydroxide, trihydrate (gibbsite: $Al_2O_3.3H_2O$) or monohydrate (boehmite: $Al_2O_3.H_2O$) is obtained. These crystals are finely ground by means of a ball mill, for example, and then calcined at not more than 800° C. to produce activated alumina.

In the process of production of the activated alumina used in the present invention, factors controlling the average pore diameter are not clear. It is considered, however, that the main factor is the particle size of the product at the dehydration and pre-stage. The average pore diameter is controlled by controlling temperature during calcination and by controlling the particle size of boehmite or gibbsite pre-stage product.

Representative examples of the activated alumina used in the present invention are activated alumina (basic, degree of activity I, Maker Code No. 02069) and activated alumina (basic, degree of activity Super I, Maker Code No. 04568) both produced by ICN-BIOMEDICALS GMBH (Germany), and activated alumina 90 (neutral, degree of activity I, Maker Code No. 1077) and activated alumina 90 (basic, degree of activity I, Maker code No. 1076) both produced by E. MERCK Corp. (U.S.A.).

The heavy metals to be removed through adsorption with the activated alumina used in the present invention refer to metal elements having an atomic number of at least 22 (Ti) in the Periodic Table.

The process of removing heavy metals by adsorption with the activated alumina of the present invention is described below with reference to purification of silver nitrate.

The process of production of silver nitrate generally comprises the following steps:

(1) Formation of Silver Nitrate Solution

Metallic silver (a lump of silver) is reacted with an excess amount of nitric acid to form a silver nitrate solution. The reaction is carried out at a temperature of from 70° to 90° C. for a reaction time of 5 to 12 hours.

(2) Neutralization

An excess amount of silver oxide ($Ag_2O$ in a slurry form) is poured into the silver nitrate solution until the pH of the resulting mixture reaches a predetermined value (usually 6) at a temperature of not higher than 60° C.

(3) Separation

The neutralized solution is allowed to stand for at least 5 hours to precipitate unreacted silver oxide, which is then separated.

(4) Purification

The separated silver nitrate solution is purified.

In a conventional purification process, crystallization is conducted repeatedly. In the present invention, in contrast, silver nitrate solution is passed through an adsorption column packed with the activated alumina to remove dissolved heavy metals through adsorption.

(5) Crystallization

Silver nitrate is obtained in crystal form from the purified silver nitrate solution, resulting in a granulated product.

In the present invention, the purification step can be carried out by (1) passing the silver nitrate solution through an adsorption column packed with the activated alumina, or (2) adding the activated alumina to the silver nitrate solution. Method (1) using an adsorption column is preferred because the purification operation is simple and can be carried out continuously.

The flow rate of silver nitrate solution passing through an adsorption column is defined as the following SV value:

SV value = (flow rate per hour)/(volume of adsorption column)

In method (1) above, the SV value is usually from 0.3 to 0.6.

In the purification step, the concentration of the silver nitrate solution is preferably 10 to 60% by weight.

The amount of the silver nitrate solution to be purified per unit weight of the activated alumina varies depending on the amount of heavy metal impurities contained in the silver nitrate solution; in general, 160 to 240 kg, as silver nitrate, dissolved in silver nitrate solution can be treated with 1 kg of the activated alumina.

The predetermined pH in the step of neutralization is usually 6; no problem arises within the range of pH of 5 to 7.

In accordance with the present invention, a high purity product can be obtained continuously using activated alumina having a high adsorption capability for heavy metals.

In accordance with the present invention, Group VIII metals of the Periodic Table, which are responsible for deterioration of photographic performance, particularly platinum group elements which have an adverse influence on photographic performance even in amounts on the order of magnitude of ppb, can be removed more easily than with conventional methods.

The present invention is described in greater detail with reference to the following non-limiting example. Unless otherwise indicated all percentages and ratios are by weight.

EXAMPLE

A 10 kg lump of silver having a purity of 99.99% was introduced into 20 kg of 40% nitric acid in a 80-liter volume enameled reactor, and dissolved therein by heating at a temperature of 90° C. for 7 hours to obtain a silver nitrate solution.

This silver nitrate solution was cooled to 60° C. and, thereafter, 1.5 kg of a silver oxide slurry was added to neutralize the nitric acid. The pH after neutralization was about 6.

The resulting solution was allowed to stand for 5 hours to precipitate the silver oxide particles remaining in the solution.

A 25 kg portion of the silver nitrate solution as a supernatant was passed at a flow rate of 5 ml/min into an adsorption column comprising a glass tube having a diameter of 1 inch and a length of 100 cm which was packed with 0.35 kg of activated alumina having a particle size of about 1 mm.

The surface acidity and average pore diameter of the activated alumina used are shown in Table 1.

The concentration of heavy metal element impurities contained in the silver nitrate solution before being passed through the adsorption column (initial concentration), and the concentration of heavy metal element impurities contained in the silver nitrate solution leaving the adsorption column were measured by an atomic absorption spectrometry. The results are shown in Table 2.

TABLE 1

| Activated Alumina | Average Pore Diameter (Å) | Surface Acidity |
|---|---|---|
| A | 30 | 10.5 |
| B | 30 | 8.4 |
| C | 30 | 4.1 |
| D | 60 | 8.4 |

TABLE 2

| | Heavy Metal Element Impurities (unit: ppb) | | | | | | | | |
|---|---|---|---|---|---|---|---|---|---|
| | Cu | Fe | Ni | Pt | Pd | Cd | Rh | Cr | Hg |
| Initial Concentration (Control) | 2400 | 1500 | 140 | 50 | 1300 | 200 | 15 | 1000 | 2 |
| Activated Alumina A (The present invention) | <1 | 10 | 30 | <1 | 10 | 1 | <1 | <1 | 1 |
| Activated Alumina B (The present invention) | <1 | 10 | 40 | <12 | 10 | 2 | <1 | <1 | 1 |
| Activated Alumina C (Comparative example) | 10 | 1200 | 120 | 5 | 1200 | 150 | 15 | 50 | 2 |
| Activated Alumina D | <1 | 20 | 40 | 2 | 700 | 10 | 2 | 10 | 2 |

TABLE 2-continued

| | Heavy Metal Element Impurities (unit: ppb) | | | | | | | |
|---|---|---|---|---|---|---|---|---|
| Cu | Fe | Ni | Pt | Pd | Cd | Rh | Cr | Hg |

(Comparative example)

<1 indicates less than 1 ppb.

As seen from the results set forth in Table 2, when the surface acidity of the activated alumina is less than 8 (activated alumina C), or the average pore diameter is more than 50 Å (activated alumina D), the concentration of the residual Group VIII elements, particularly the platinum group elements is high; and thus they are not effectively removed. In contrast, the use of activated alumina according to the present invention permits effective removal of the elements. That is, in the activated alumina A and B, the concentration of the residual elements is low.

While the invention has been described in detail and with reference to specific embodiments, it will be apparent to one skilled in the art that various changes and modifications can be made in these embodiments without departing from the spirit and scope of the invention.

What is claimed is:

1. A process for removing heavy metals from a silver nitrate solution comprising the step of:
   bringing said silver nitrate solution into contact with activated alumina having a surface acidity of at least 8 and an average pore diameter between 15 Å and 50 Å.

2. The process as claimed in claim 1, wherein said surface acidity is at least 9.

3. The process as claimed in claim 1, wherein said surface acidity is between 8 and 12.

4. The process as claimed in claim 1, wherein said average pore diameter is not more than 40 Å.

5. The process as claimed in claim 1, wherein said average pore diameter is between 20 Å and 40 Å.

6. The process as claimed in claim 1, wherein the concentration of said silver nitrate solution is 10–60% by weight.

7. The process as claimed in claim 1, wherein the ratio by weight of the amount of said silver nitrate in said silver nitrate solution to the amount of said activated alumina is 160–240 : 1.

8. The process as claimed in claim 1, wherein said activated alumina is packed into a fixed bed adsorption apparatus as adsorbent.

* * * * *